Dec. 29, 1936.　　　F. GIRVIN ET AL　　　2,066,176
COMMUTATING BRUSH
Filed Sept. 27, 1935
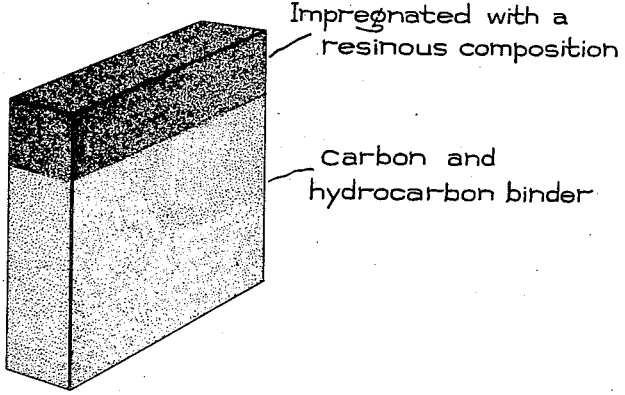
Inventors:
Fred Girvin,
William H. Hardman,
by Harry E. Dunham
Their Attorney.

Patented Dec. 29, 1936

2,066,176

UNITED STATES PATENT OFFICE 2,066,176

COMMUTATING BRUSH

Fred Girvin and William H. Hardman, Schenectady, N. Y., assignors to General Electric Company, a corporation of New York Application September 27, 1935, Serial No. 42,431

6 Claims. (Cl. 171—325)

The present invention relates broadly to brushes for use in electrical apparatus and more particularly to improved commutating brushes.

It is an object of our invention to provide an improved electrical commutating brush having a low sparking tendency, high mechanical strength and definite resistivity.

Electrical brushes made from carbon bonded with hydrocarbon compounds have long been in use. The carbon in this type of brush is ordinarily loosely bonded together thereby lowering the tendency to spark. However, porous brushes consisting merely of carbon loosely bonded together with hydrocarbon compounds have been restricted in use due to their mechanical weakness. Brushes of this type frequently fracture at the end held by the pressure arm.

Electrical brushes made from carbon bonded with various synthetic resins have also been in use. While brushes of this type containing a high percentage of synthetic resin may possess good mechanical strength, the carbon is closely bonded giving a non-porous brush which blackens and burns as a result of excessive sparking particularly when used in a commutating or collecting capacity. Moreover, electrical brushes composed of carbon bonded with synthetic resin have also found restricted use as the resin decomposes when subjected to high commutating temperatures. On decomposition of the resin, this type of brush is easily cracked and broken.

It has been proposed to strengthen the brush by the introduction of various foreign ingredients. For example, the use of clay and other inorganic binders have been suggested. Brushes constructed in this manner have not been found entirely satisfactory for all applications as the mixing of foreign ingredients with the carbon have been accompanied by a change in the electrical resistance. A brush combining low tendency toward sparking, high mechanical strength and definite resistivity has, therefore, long been sought in the art.

We have discovered that when the conductor-contacting or clamping end of a porous commutating brush consisting of carbon and a hydrocarbon binder is impregnated with a synthetic resin and cured so as to set the latter, the brush possesses the advantages enumerated above.

The accompanying drawing shows a commutating brush made in accordance with our invention.

According to our invention carbon in the form of pulverized coke, graphite, lamp black or the like, is mixed thoroughly with about 30 to 35 per cent by weight of a hydrocarbon binder, such as pitch or coal tar. The mixture is compacted into desired form and fired to a temperature around 1370° C. for about 58 to 60 hours to completely carbonize the binder. An additional graphitizing heat treatment at 2500°–3000° C. for 5–10 hours may be employed to improve the conducting properties of the brush. The porous molded brushes next are impregnated by being placed on end in a shallow bath of synthetic resin. The degree of impregnation can be controlled by the temperature of the bath and the time of immersion. Brushes having the end impregnated for example up to 0.5 inch for one hour at a temperature of about 50 to 55° C. have been found satisfactory.

The molded impregnated brushes are again fired to a curing temperature around 175 to 250° C. for about 24 hours. The temperatures required to cure the resin vary with the particular resin composition.

It has been found that brushes impregnated with synthetic resins of the vinyl and alkyd types have excellent electrical and mechanical properties. The vinyl resins consist usually of polymerized vinyl compounds, such for example as a combination of polymerized vinyl chloride and polymerized vinyl acetate. The alkyd resins are composed of reaction products formed from a polybasic acid, such as phthalic acid or its anhydride, and a polyhydric alcohol, such as glycerine, with or without various modifying agents. The synthetic resin impregnated brushes made in accordance with our process are not subject to decomposition for while the commutator contacting end of the brush may reach high temperatures the end held by the pressure arm containing the synthetic resin remains relatively cool.

While the brushes constructed in accordance with our process have porous commutator contacting tips which lower tendencies toward sparking, the impregnated end held by the pressure arm is non-porous and mechanically of sufficient strength to be free from cracking or breaking tendencies. The resistivity of the brush is also easily controlled as the impregnation of the tip to be held by the pressure arm (not shown) with the small percentage of resin does not appreciably change the conductivity.

Although we have described our invention enumerating certain specific ingredients, we do not wish to be limited thereto as various equivalents coming within the scope of our invention are meant to be covered in the appended claims.

What we claim as new and desire to secure by Letters Patent of the United States, is:

1. A molded commutating brush having a porous commutator contacting end of loosely bonded carbon, and a non-porous conductor contacting end composed of a closely bonded carbon impregnated with a resinous composition.

2. A commutating brush free from sparking tendencies composed of carbon and carbonized hydrocarbon binder and having the end adapted to be held by a pressure arm, closely bonded with a cured synthetic resin.

3. A molded commutating brush consisting of graphite bonded with carbonized hydrocarbon binder and having the conductor contacting end impregnated with vinyl resin.

4. A molded commutating brush consisting of graphite bonded with carbonized hydrocarbon binder and having the end adapted to be held by a pressure arm, impregnated with alkyd resin.

5. The process of making a brush for use with electrical apparatus, which comprises thoroughly mixing carbon with a hydrocarbon binder, compacting the mixture into desired form, firing at a temperature and for a time sufficient to completely carbonize said hydrocarbon binder, impregnating the end of the porous loosely bonded brush to be held by the pressure arm with a resinous composition and heating the brush at a temperature and for a time sufficient to cure said resin.

6. The process of making an electrical brush having improved commutating characteristics, which comprises thoroughly mixing carbon with about 30 to 35 per cent by weight of hydrocarbon binder, molding the mixture into the desired form, firing at a temperature and for a time sufficient to completely carbonize said hydrocarbon binder, impregnating the end to be held by a pressure arm with a synthetic resin and heating the brush at a temperature and for a time sufficient to cure said resin.

FRED GIRVIN.
WILLIAM H. HARDMAN.